(12) United States Patent
Krautter et al.

(10) Patent No.: US 11,767,001 B2
(45) Date of Patent: Sep. 26, 2023

(54) METHOD FOR OPERATING A BRAKE SYSTEM, AND BRAKE SYSTEM

(71) Applicant: Robert Bosch GmbH, Stuttgart (DE)

(72) Inventors: Andreas Krautter, Steinheim (DE); Bertram Foitzik, Ilsfeld (DE); Daniel Frank, Kleinsachsenheim (DE); Dirk Foerch, Neuenstadt/Stein (DE); Jens Wagner, Untergruppenbach (DE); Stefan Zahariev, Ilsfeld (DE); Timo Haible, Backnang (DE); Verena Barske, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 465 days.

(21) Appl. No.: 17/254,779

(22) PCT Filed: May 25, 2019

(86) PCT No.: PCT/EP2019/063551
§ 371 (c)(1),
(2) Date: Dec. 21, 2020

(87) PCT Pub. No.: WO2020/020516
PCT Pub. Date: Jan. 30, 2020

(65) Prior Publication Data
US 2021/0269004 A1 Sep. 2, 2021

(30) Foreign Application Priority Data
Jul. 24, 2018 (DE) .......................... 102018212279.2

(51) Int. Cl.
*B60T 13/74* (2006.01)
*B60T 13/16* (2006.01)
(Continued)

(52) U.S. Cl.
CPC ............ *B60T 13/161* (2013.01); *B60T 7/042* (2013.01); *B60T 8/36* (2013.01); *B60T 13/686* (2013.01);
(Continued)

(58) Field of Classification Search
CPC ...... B60T 13/686; B60T 13/74; B60T 13/745; B60T 13/161; B60T 7/042; B60T 8/36; B60T 8/4081; B60T 2270/82
See application file for complete search history.

(56) References Cited

U.S. PATENT DOCUMENTS

| 6,520,600 B1 * | 2/2003 | Tackett | ............... F16K 31/0655 |
| | | | 303/119.2 |
| 2016/0046272 A1 * | 2/2016 | Masur | ................... B60T 13/686 |
| | | | 60/545 |

(Continued)

FOREIGN PATENT DOCUMENTS

| DE | 102009000769 A1 | 8/2010 |
| DE | 102011077329 A1 | 1/2012 |

(Continued)

OTHER PUBLICATIONS

International Search Report for PCT/EP2019/063551, dated Sep. 27, 2019.

*Primary Examiner* — Bradley T King
(74) *Attorney, Agent, or Firm* — NORTON ROSE FULBRIGHT US LLP; Gerard Messina

(57) ABSTRACT

A method for operating a brake system. A brake request signal is generated, and a setpoint brake pressure required in an active circuit is ascertained. An actual brake pressure is set according to the setpoint brake pressure. A wheel brake actuated by the active circuit is hydraulically decoupled from the pressure generation device by closing an isolation valve, which is situated between the pressure generation device and the wheel brake, the isolation valve is preloaded (Continued)

to a closed state counter to an inflow direction of a volume flow into a brake-side section between the isolation valve and the wheel brake. A hydraulic recoupling of the wheel brake takes place by opening the isolation valve in that the actual brake pressure is set according to the setpoint brake pressure and an opening force is simultaneously applied to the isolation valve such that a compensation of a closing force takes place.

9 Claims, 2 Drawing Sheets

(51) Int. Cl.
    *B60T 7/04*     (2006.01)
    *B60T 8/36*     (2006.01)
    *B60T 13/68*    (2006.01)
    *B60T 8/40*     (2006.01)

(52) U.S. Cl.
    CPC ......... *B60T 8/4081* (2013.01); *B60T 2270/82* (2013.01)

(56) References Cited

U.S. PATENT DOCUMENTS

| | | | |
|---|---|---|---|
| 2018/0015912 A1* | 1/2018 | Foitzik | B60T 13/146 |
| 2020/0180579 A1* | 6/2020 | Heinz | B60T 13/745 |
| 2020/0223415 A1* | 7/2020 | Foerch | B60T 13/146 |
| 2021/0053540 A1* | 2/2021 | Besier | B60T 8/326 |
| 2021/0300312 A1* | 9/2021 | Krautter | B60T 13/686 |
| 2022/0135015 A1* | 5/2022 | Haible | B60T 13/745 |
| | | | 303/6.01 |
| 2022/0281428 A1* | 9/2022 | Stone | B60T 13/145 |
| 2022/0348177 A1* | 11/2022 | Foitzik | B60T 7/02 |
| 2023/0001908 A1* | 1/2023 | Einig | B60T 17/222 |
| 2023/0027578 A1* | 1/2023 | Seol | B60T 17/22 |

FOREIGN PATENT DOCUMENTS

| | | |
|---|---|---|
| DE | 102011079454 A1 | 1/2013 |
| DE | 102016201998 A1 | 8/2016 |
| DE | 102016208564 A1 | 11/2017 |
| DE | 102016216973 A1 | 3/2018 |
| JP | 2009067269 A | 4/2009 |
| WO | 2006111393 A1 | 10/2006 |
| WO | 2011108090 A1 | 9/2011 |
| WO | 2011154275 A1 | 12/2011 |
| WO | 2014195092 A1 | 12/2014 |

\* cited by examiner

METHOD FOR OPERATING A BRAKE SYSTEM, AND BRAKE SYSTEM

BACKGROUND INFORMATION

Brake systems for vehicles, in particular for motor vehicles such as cars or trucks, are usually realized in the form of electrohydraulic brake systems in which a master brake cylinder actuated by a manual actuation device generates a hydraulic pressure in a brake circuit in order to actuate wheel brakes. Generally, a pressure generation device, which has an electric motor and a displacement piston or plunger which is movable with the aid of the electric motor, assists in the pressure generation in the brake force characteristic To an increasing extent, so-called brake-by-wire systems are used as well. For example, such a system is described in German Patent Application No. DE 10 2011 079 454 A1. An actuating circuit in which a hydraulic pressure is generated by actuating a master brake cylinder is provided in this brake system. This pressure is acquired, and a setpoint brake pressure is ascertained based on the acquired pressure, which a pressure generation device including an electric motor and a displacement piston movable by the electric motor sets in an active circuit for the operation of the wheel brakes.

SUMMARY

The present invention relates to a method for operating a brake system and to a brake system for a vehicle, in particular for a motor vehicle.

According to a first aspect of the present invention, a method is provided for operating a brake system for a vehicle.

In the method according to an example embodiment of the present invention, a brake request signal which characterizes a brake request is generated by actuating a positioner system of an actuating circuit. In this step a signal is, thus, generated, which represents a desired deceleration of the vehicle.

In a further step, a setpoint brake pressure required in an active circuit is ascertained based on the brake request signal. The brake request signal thus forms an input variable for an ascertainment function, which may be realized in the form of a software module, for example. This ascertainment function ascertains as an output variable a value for a brake pressure to be set in an active circuit.

In addition, with the aid of a pressure generation device, an actual brake pressure is set in the active circuit according to the setpoint brake pressure.

In a further step, a wheel brake, actuated by the active circuit, is hydraulically decoupled from the pressure generation device by closing an isolation valve which is situated in a hydraulic path between the pressure generation device and the wheel brake, a preloading device preloading the isolation valve to a closed state counter to an inflow direction of a volume flow into a brake-side section of the hydraulic path between the isolation valve and the wheel brake. Accordingly, after closing the isolation valves, the set brake pressure in the active circuit is maintained between the wheel brake and the isolation valve since the brake-side section of the hydraulic path situated between the isolation valve and the wheel brake forms a sealed volume. The wheel brake is therefore actuated by the adjusted pressure, independently of the pressure generation device, for as long as the isolation valve remains closed. In particular, the isolation valve is situated in the hydraulic path in such a way that a valve body is pressed against a valve seat by a pressure that prevails in the brake-side section of the hydraulic path and is greater than the pressure in a pressure-generator-side section of the hydraulic path between the isolation valve and the pressure generator. In the closed state, the isolation valve thus reliably prevents a volume flow of hydraulic fluid in a return-flow direction from the brake-side section into the pressure-generator-side section of the hydraulic path. The isolation valve is preloaded to the closed state by a preloading device, e.g., by a spring. The force applied to the valve, in particular the valve body, by the preloading device thus acts in the return-flow direction or counter to an inflow direction of the hydraulic fluid from the pressure-generator-side section into the brake-side section of the hydraulic path.

In a further step, a pressure-generator-side system pressure between the pressure generation device and the isolation valve is lowered with the aid of the pressure generation device. This offers the advantage that the loading of the pressure generation device is able to be reduced.

Following this pressure reduction, the wheel brake is hydraulically coupled again by opening the isolation valve in that the actual brake pressure as the pressure-generator-side system pressure is set according to the setpoint brake pressure with the aid of the pressure generation device and an opening force is simultaneously applied to the isolation valve such that a closing force by which the preloading device preloads the isolation valve is compensated. Accordingly, the isolation valve is actuated as soon as the increase of the pressure has started in the pressure-generator-side section of the hydraulic path. In the process, the isolation valve is particularly actuated in such a way that only the force applied by the preloading device is overcome. The force applied to the isolation valve or the valve body is therefore of sufficient magnitude to overcome the force applied by the preloading device. However, because the pressure acting in the brake-side section of the hydraulic path at the start of the pressure increase is still greater than the system pressure in the pressure-generator-side section of the hydraulic path, the valve is not opened by the applied opening force because it is pressed to the closed position as described above. Only once the system pressure in the pressure-generator-side section of the hydraulic path is greater than or equal to the pressure in the brake-side section of the hydraulic path will the isolation valve open in response to the pressure applied in the pressure-generator-side section.

According to a further aspect of the present invention, a brake system for a vehicle is provided.

In accordance with an example embodiment of the present invention, the brake system includes an actuating circuit having a positioner system actuable by an actuation device for the generation of a brake request signal, and an active circuit having a pressure generation device, at least one wheel brake hydraulically coupled with the pressure generation device, and an isolation valve, which is situated in a hydraulic path between the pressure generation device and the wheel brake, a preloading device preloading the isolation valve to a closed state counter to an inflow direction of a volume flow into a brake-side section of the hydraulic path between the isolation valve and the wheel brake. Thus, the isolation valve is situated in the hydraulic path in particular in such a way that a valve body is pressed against a valve seat by a pressure which prevails in the brake-side section of the hydraulic part and is greater than the pressure in a pressure-generator-side section of the hydraulic path between the isolation valve and the pressure generator. In the closed state, the isolation valve thus reliably prevents a volume flow of hydraulic fluid in a return-flow direction from the brake-side section into the pressure-generator-side section of the hydraulic path. A preloading device, e.g., a spring, preloads the isolation valve to the closed state. The force applied to the valve, in particular the valve body, by the preloading device thus acts in the return-flow direction or counter to an inflow direction of the hydraulic fluid from the pressure-generator-side section into the brake-side section of the hydraulic path.

In addition, the brake system includes a control unit, which is connected to the positioner system of the actuating circuit, to the pressure generation device, and to the isolation valve. The control unit is set up to ascertain from the brake request signal a setpoint brake pressure required in the active circuit, to actuate the pressure generation device for the adjustment of an actual brake pressure in the active circuit according to the setpoint brake pressure, to close the isolation valve for the hydraulic decoupling of the wheel brake from the pressure generation device, and to open the isolation valve for the hydraulic coupling of the wheel brake in that the control unit actuates the pressure generation device for the adjustment of the actual brake pressure in a pressure-generator-side section of the hydraulic path between the isolation valve and the pressure generation device according to the setpoint brake pressure, while simultaneously applying an opening force to the isolation valve such that a compensation of a closing force takes place by which the preloading device preloads the isolation valve.

The control unit thus in particular is set up to induce the brake system to execute the method according to the present invention.

In accordance with an example embodiment of present invention the pressure in the pressure-generator-side section of the active circuit is lowered, with the isolation valve being closed, after the hydraulic decoupling of a wheel brake of the active circuit from the pressure generation device of the active circuit with the aid of the isolation valve, and the wheel brake is hydraulically recoupled, to actuate the isolation valve simultaneously with a pressure increase in the pressure-generator-side section such that only a preloading force is overcome which preloads the isolation valve to a closed position. Since the isolation valve is preloaded to a closed state counter to an inflow direction of the volume flow into the brake-side section according to the present invention, the actual opening of the valve takes place passively by the hydraulic fluid to conveyed to the brake-side section as soon as the system pressure on the pressure-generator-side section reaches the pressure prevailing in the hydraulic path on the brake side.

In this manner, the isolation valve is always reliably switchable, even when the precise pressure in the brake-side section of the hydraulic path is unknown. In particular, a dynamic coupling in the presence of rapidly changing braking requests is made easier because the actuation of the isolation valve for overcoming the preloading force begins simultaneously with the start of the pressure increase, so that a belated actuation of the valve is avoided. In addition, pressure peaks in the pressure-generator-side section of the hydraulic path which can arise by a belated opening of the isolation valve are advantageously avoided because the isolation valve opens automatically as soon as the brake-side pressure is reached. Another advantage is that the force required to open the isolation valve or to be generated by actuating the isolation valve, e.g., with the aid of the actuator, is low because only the preloading force rather than a pressure force possibly acting on the brake side has to be overcome by the actuation.

It may be provided that the hydraulic decoupling of the wheel brake requires the presence of one or more of the following conditions:
a) the brake request signal is constant over a predefined period of time,
b) an acquired rotational speed of a wheel braked by the wheel brake is smaller than a predefined rotational speed setpoint value,
c) the ascertained setpoint brake pressure of the active circuit is greater than a predefined pressure threshold value,
d) a volume of hydraulic fluid held in a reservoir of the pressure generation device falls below a predefined threshold value.

Another typical case for the decoupling of the wheel brakes is given by condition d). The decoupling allows for a replenishment of hydraulic fluid in a reservoir of the pressure generation device from an external source such as a storage reservoir of the brake system.

The hydraulic recoupling, for example, may take place under one or more of the following condition(s):
  a certain time span has elapsed since the decoupling,
  the brake request signal changes,
  the above-mentioned condition under d) is no longer satisfied, for example because sufficient hydraulic fluid has been replenished,
  the brake pressure in the brake-side section of the hydraulic path drops below a predefined threshold value.

According to a further embodiment of the present method in accordance with the present invention, it is provided that the positioner system has a master brake cylinder, which is actuable by an actuation device, and a sensor system, and the generation of the brake request signal includes an acquisition of a hydraulic pressure generated by the actuation of the master brake cylinder in the actuating circuit, and/or an acquisition of the positioning travel of the actuation device as variables characterizing the brake request. The brake request signal is therefore formed by the acquired hydraulic pressure in the actuating circuit and by the control travel of the actuation device or is composed of these variables.

According to a further embodiment of the present method in accordance with the present invention, the pressure generation device has a displacement piston, which is moved in a forward direction for the adjustment of the actual brake pressure as the pressure-generator-side system pressure according to the setpoint brake pressure during the hydraulic coupling in order to generate a volume flow in the inflow direction. To induce a pressure increase in the pressure-generator-side section, the displacement piston is therefore moved in a forward direction such that the volume of the pressure-generator-side section is reduced.

According to a further embodiment of the present method in accordance with the present invention, it is provided that hydraulic fluid is introduced into the pressure-generator-side section of the hydraulic path during the lowering of the pressure-generator-side system pressure. Additional hydraulic fluid is thereby introduced into the active circuit. This takes place in the pressure-generator-side section of the hydraulic path with a closed isolation valve, e.g., in order to be able to adjust higher brake pressures or to compensate for leakages.

According to a further embodiment of the present method in accordance with the present invention, it is provided that the isolation valve is a solenoid valve and a current flow is generated for opening the isolation valve. In the process, the opening force is generated by an energization of the isolation valve. The isolation valve is embodied in such a way that it is kept in the closed position in the currentless state. This further improves the reliability of the brake system because a return flow of hydraulic fluid into the pressure-generator-side section is reliably avoided.

According to one embodiment of the brake system in accordance with the present invention, the positioner system has a master brake cylinder which is actuable by the actuation device, and a sensor system for acquiring a hydraulic pressure in the actuating circuit generated by actuating the master brake cylinder and/or for acquiring a positioning travel of the actuation device as variables characterizing a brake request, the brake request signal being formed by the variables that characterize the brake request and are acquired with the aid of the sensor device.

According to a further embodiment of the brake system in accordance with the present invention, it is provided that the pressure generation device has a displacement piston, which is movable in a translatory fashion in a forward direction in order to generate a volume flow in the inflow direction.

According to an additional embodiment of the brake system in accordance with the present invention, it is provided that the isolation valve is a solenoid valve to which a current flow may be applied in order to adjust an open state.

The features and advantages described in connection with the method according to the present invention similarly also apply to the brake system according to the present invention and vice versa.

Below, the present invention is described in greater detail with the aid of the exemplary embodiments shown in the schematic figures.

BRIEF DESCRIPTION OF THE DRAWINGS

Unless stated otherwise, identical, functionally equivalent and similarly acting elements, features and components have been provided with the same reference numerals in the figures.

DETAILED DESCRIPTION OF EXAMPLE EMBODIMENTS

Figure 1:
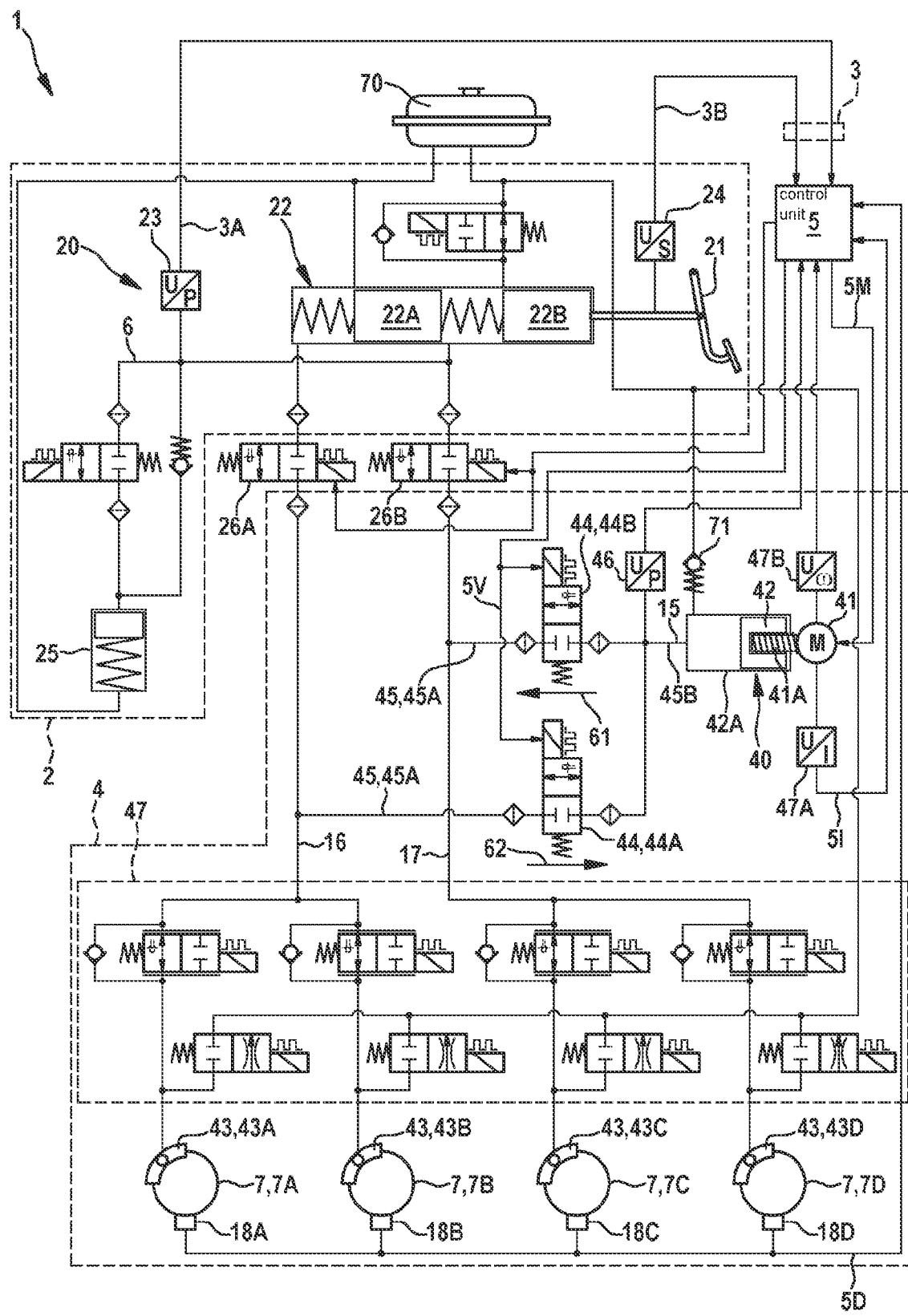
FIG. 1 shows a schematic representation of a brake system according to an exemplary embodiment of the present invention.

FIG. 1 exemplarily shows a brake system 1 for a vehicle. As illustrated in FIG. 1, brake system 1 has an actuating circuit 2, an active circuit 4, and a control unit 5.

Actuating circuit 2 exemplarily shown in FIG. 1 includes a positioner system 20 and an actuation device 21. As illustrated in FIG. 1 by way of example, positioner system 20 may in particular have a hydraulic master brake cylinder 22 as well as a sensor system including at least a pressure sensor 23 and a positioning-travel sensor 24. Positioner system 20 furthermore may have an optional restoring simulator 25. In the positioner system 20 exemplarily shown in FIG. 1, master brake cylinder 22 is actuable with the aid of actuation device 21, which is shown in FIG. 1 as a foot pedal by way of example. The actuation of master brake cylinder 22 includes a displacement of one or more displacement piston(s) 22A, 22B, which causes a hydraulic fluid such as oil to be displaced counter to a restoring force and a hydraulic pressure to be generated in actuating circuit 2.

The restoring force, for example, is able to be generated by the optional restoring simulator 25, which is hydraulically coupled, i.e., in a fluid-conducting manner, to master brake cylinder 22 via a hydraulic line 6.

Optional pressure sensor 23 acquires the pressure generated by master brake cylinder 22 and generates a pressure signal 3A representing this pressure. Pressure sensor 23 in FIG. 1 is hydraulically coupled via restoring simulator 25 to hydraulic line 6 by way of example. Optional positioning-travel sensor 24 detects a positioning travel carried out by actuation device 21 and generates a positioning-travel signal 3B which represents the positioning travel. Pressure signal 3A and positioning-travel signal 3B jointly form an exemplary brake request signal 3 in this case, which is generated with the aid of positioner system 20.

As an alternative, positioner system 20 may also be formed only by positioning-travel sensor 24, which acquires the positioning travel of actuation device 21. Brake request signal 3 is formed by positioning-travel signal 3B in this case.

Active circuit 4 has a pressure generation device 40, at least one wheel brake 43, and at least one isolation valve 44. Active circuit 4 optionally also has a brake control valve system 47. In FIG. 1, an active circuit 4, which has a total of four wheel brakes 43A, 43B, 43C, 43D and two isolation valves 44A, 44B, is shown by way of example.

Pressure generation device 40 preferably has an electric motor 41 and a displacement piston 42, which is movable in a translatory fashion in a forward direction and a reverse direction with the aid of electric motor 41. To convert a rotational movement of electric motor 41 into a translation movement of displacement piston 42, a gear unit 41A may be provided, which is only schematically illustrated in FIG. 1 and kinetically couples electric motor 41 to displacement piston 42. Displacement piston 42 is movable in a guide cylinder 42A, thereby bringing about a displacement of hydraulic fluid such as oil located in guide cylinder 42A.

Figure 2:
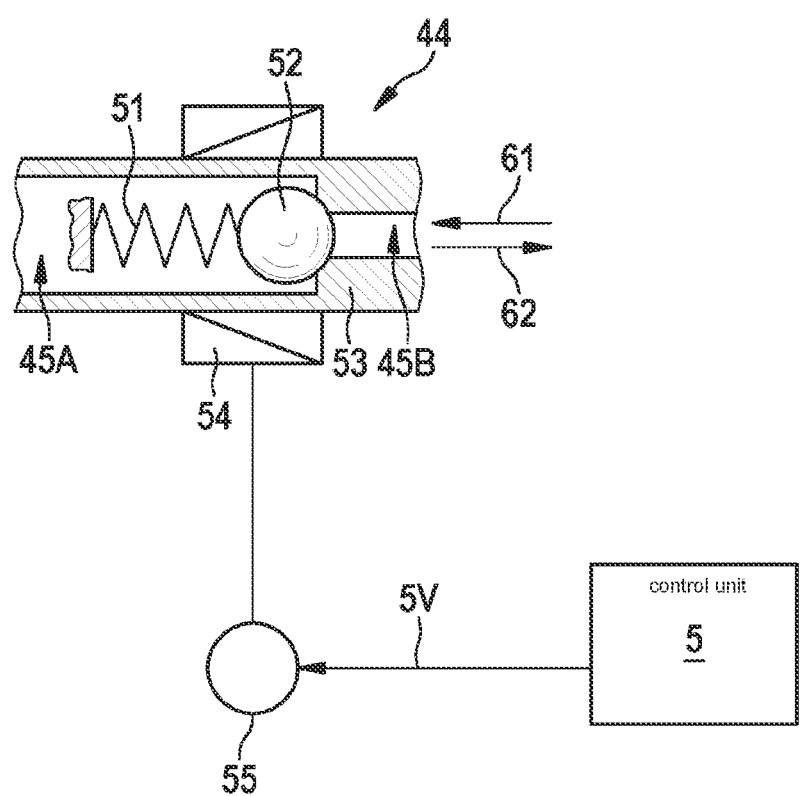
FIG. 2 shows a schematic representation of an isolation valve in a brake system according to an exemplary embodiment of the present invention.

Isolation valves 44A, 44B are able to be realized as solenoid valves or as electromechanical switching valves, for instance. FIG. 2 exemplarily and only schematically illustrates an isolation valve 44 realized as a solenoid valve. Isolation valve 44 has a preloading device 51, a valve body 52, a valve seat 53, and an actuator in the form of an electromagnet 54. Isolation valves 44A, 44B are switchable between an open state in which they allow a fluid to pass through, and a closed state in which isolation valves 44A, 44B block the passage of fluid. In FIGS. 1 and 2, isolation valves 44A, 44B are shown in a closed state by way of example. As schematically illustrated in FIG. 2, valve body 52 is retained against valve seat 53 in the closed state of valve 44. In particular, preloading device 51 preloads valve body 52 to the closed state by a closing or preloading force. To open isolation valve 44, an electric current flow is generated in electromagnet 54, e.g., by actuating an electric voltage source 55, which is electrically connected to electromagnet 54. The current flow generates a magnetic force as an opening force, which removes valve body 52 from valve seat 53 counter to the closing force applied to valve body 52 by preloading device 51 and thereby allows hydraulic fluid to pass through.

Wheel brakes 43A, 43B, 43C, 43D act via friction coatings (not shown) on friction surfaces provided on a respective wheel, e.g., in the form of a brake disk 7A, 7B, 7C, 7D, in order to brake the respective wheel.

Optional brake control valve system 47 is shown only schematically in FIG. 1 and is used for the individual control of respective wheel brakes 43A, 43B, 43C, 43D. Brake control valve system 47 will not be further described here for reasons of clarity.

Isolation valves 44A, 44B are hydraulically coupled with pressure generation device 40 via a branching hydraulic line 15. Furthermore, first pressure valve 44A is coupled via a branching hydraulic line 16 to brake disks 7A and 7B of the wheels (not shown). Second pressure valve 44B is coupled via branching hydraulic line 17 with brake disks 7C and 7D of the wheels (not shown). Hydraulic lines 15, 16, 17 thus form a hydraulics path 45 between pressure generation device 40 and the at least one wheel brake 43. Hydraulic lines 16, 17 connected to wheel brakes 43 form a brake-side section 45A of hydraulics path 45. Hydraulic line 15 connected to pressure generation device 40 forms a pressure-generator-side section 45B of hydraulics path 45.

As may be gathered from FIG. 1, in particular, a volume flow of the hydraulic fluid in an inflow direction 61, i.e., out of pressure-generator-side section 45B into brake-side section 45A of hydraulics path 45, is able to be generated with open isolation valves 44A, 44B by moving displacement piston 42 in the forward direction. Conversely, with open isolation valves 44A, 44B, a volume flow of the hydraulic fluid in a return-flow direction 62, i.e., out of brake-side section 45A into pressure-generator-side section 45B of hydraulics path 45, is able to be generated by moving displacement piston 42 in the reverse direction.

As schematically illustrated in FIG. 2, preloading device 51 preloads isolation valve 44 to the closed state with the aid of counter to inflow direction 61 of the volume flow of the hydraulic fluid into brake-side section 45A of hydraulic path 45. In particular, valve body 52 is situated so as to face brake-side section 45A of hydraulic path 45. In general, isolation valve 44 thus is situated in hydraulic path 45 in such a way that a valve body 52 is pressed against valve seat 53 to the closed position when a pressure prevailing in brake-side section 45A of hydraulic path 45 is greater than the pressure in pressure-generator-side section 45B of hydraulic path 45.

In addition, it is illustrated in FIG. 1 that brake system 1 has an optional reservoir 70, which contains hydraulic fluid. Via a nonreturn valve 71, reservoir 70 is hydraulically coupled with pressure-generator-side section 45B of hydraulic path 45. Nonreturn valve 71 is embodied in such a way that it opens and enables a fluid flow into pressure-generator-side section 45B of hydraulic path 45 when the pressure in pressure-generator-side section 45B of hydraulic path 45 is lower than a predefined threshold value.

FIG. 1 furthermore shows that an optional brake-pressure sensor 46 for sensing a brake pressure in pressure-generator-side section 45B of hydraulic path 45 may be provided. By way of example, FIG. 1 also shows optional motor sensors 47A, 47B for sensing operating variables of the electric motor such as an operating current or a rotary position.

As illustrated in FIG. 1, actuating circuit 2 may be hydraulically coupled with active circuit 3 via optional valves 26A, 26B in order to enable an actuation of wheel brakes 43 via master brake cylinder 22 in the event of an operating failure of pressure generation device 40. To this end, displacement pistons 22A, 22B are connected to hydraulic lines 16, 17 via valves 26A, 26B, these valves 26A, 26B possibly having a similar design as isolation valves 44A, 44B. In FIG. 1, valves 26A, 26B are shown in a closed state.

As furthermore illustrated in FIG. 1, control unit 5 is connected to positioner system 20 of actuating circuit 2, in particular to sensors 23, 24 of positioner system 20, to pressure generation device 40, and to isolation valve 44. Moreover, control unit 5 may be connected to optional valves 26A, 26B, to optional brake-pressure sensor 46 as well as to optional motor sensors 47A, 47B. In this context, "connected" describes a functional connection, in particular a data connection, which may be realized in a wire-conducted or wireless manner.

Control unit 5 in particular may have a processor (not shown) and a data memory (not shown), the data memory including software, which is set up to induce the processor to execute the functions described in the following text or the method described in the following text.

Hereinafter, the method according to the present invention will be described by way of example based on the aforedescribed brake system 1.

When operating brake system 1 in a vehicle, a brake request signal 3, which characterizes a brake request, is first generated by actuating positioner system 20. For example, actuation device 21 is moved so that master brake cylinder 22 is operated against the restoring force of optional restoring simulator 25. Pressure sensor 23 and positioning-travel sensor 24 sense a pressure and a positioning travel, respectively. Pressure sensor 23 generates a corresponding pressure signal 3A, and positioning-travel sensor 24 generates a corresponding positioning-travel signal 3B. These form brake request signal 3 and are transmitted to control unit 5.

Control unit 5 ascertains on the basis of brake request signal 3 a setpoint brake pressure required in active circuit 4 and generates a corresponding motor control signal 5M, which is transmitted by pressure generation device 40 to optional electric motor 41 of pressure generation device 40, for example.

Based on motor control signal 5M, pressure generation device 40 sets the setpoint brake pressure as the actual brake pressure in the active circuit. In particular, electric motor 41 is able to be operated according to motor control signal 5M with open isolation valves 44A, 44B and moves optional displacement piston 42 in the forward or the reverse direction in such a way that the setpoint brake pressure is set in the active circuit. A closed-loop control is optionally able to be realized with the aid of optional brake pressure sensor 46, in which the brake pressure in the active circuit is controlled according to the setpoint brake pressure.

After the setpoint brake pressure has been reached in the active circuit, control unit 5 generates a valve-control signal 5V, which causes isolation valves 44A, 44B to close. For example, voltage source 55 is actuated in order to interrupt a current flow through electromagnet 54 so that valve body 52 is moved against valve seat 53 to the closed position due to the closing force exerted by preloading device 51 on valve body 52 in return-flow direction 62. This causes the at least one wheel brake 43 to be hydraulically decoupled from pressure generation device 40.

For example, the hydraulic decoupling may take place under the condition that brake request signal 3 is constant across a predefined period of time. "Constant" in this context particularly means that a change in brake request signal 3 is smaller than a predefined value. For instance, brake request signal 3 is constant when neither pressure signal 3A nor positioning-travel signal 3B changes by more than a predefined value, e.g., no more than 1%, within a predefined period of time such as three seconds. A constant brake request signal 3 results with a constant brake pressure.

As an alternative or in addition, the hydraulic decoupling may be linked with the presence of further or other conditions. For example, it is possible to sense a wheel speed of the wheels (not shown) at the wheels (not shown) with the aid of wheel speed sensors 18A, 18B, 18C, 18D and to transmit it as rotational speed signal 5D to control unit 5. The hydraulic decoupling may be carried out under the additional condition that the sensed rotational speed is smaller than a predefined rotational speed threshold value. Also, it may be required as an additional condition that the ascertained setpoint brake pressure of active circuit 4 is greater than a predefined pressure threshold value. Alternatively or additionally, it may also be required as a condition that a variable characterizing a thermal loading of electric motor 41 of the pressure generation device reaches a predefined load threshold value. For example, the operating current acquired with the aid of motor sensor 47A is able to be transmitted as current signal 51 to control unit 5. If operating current 51 lies above a limit value for a certain time, then isolation valves 44 are closed.

Another possible condition for the decoupling may be that the volume of hydraulic fluid contained in guide cylinder 42A of pressure generation device 40 drops below a predefined minimum volume. In this case hydraulic fluid can be replenished from reservoir 70 while isolation valves 44A, 44B are closed.

After isolation valves 44A, 44B have been closed, the pressure is lowered in pressure-generator-side section 45B of hydraulic path 45 with the aid of pressure generation device 40. For instance, this may be accomplished in that electric motor 41 is actuated by a motor control signal 5M generated by control unit 5 in such a way that displacement piston 42 is moved in the rearward direction in order to enlarge the volume in guide cylinder 42A. Electric motor 41 may then optionally be switched off. Optionally, the pressure in pressure-generator-side section 45B of hydraulic path 45 (pressure-generator-side system pressure) is lowered to such an extent that nonreturn valve 71 opens and hydraulic fluid from optional reservoir 70 is thereby conveyed to pressure-generator-side section 45B of hydraulic path 45. After the decoupling, hydraulic fluid is also able to be introduced into pressure-generator-side section 45B of hydraulic path 45 in some other manner, e.g., with the aid of an active supply device such as a pump (not shown).

After the pressure-generator-side system pressure between pressure generation device 40 and isolation valve 44 has been lowered with the aid of pressure generation device 40, at least one wheel brake 43 is hydraulically coupled to pressure generation device 40 again. For instance, this may be realized under the condition that brake-request signal 3 changes or under the condition that a predefined time span, e.g., in a range of between 30 seconds and 45 seconds, has elapsed since isolation valve 44 was closed. Of course, the satisfying of additional or other criteria is possible as well as a condition for the coupling, for instance that the volume contained in cylinder 42A lies within a predefined range again after the replenishment.

For the hydraulic coupling, the actual brake pressure as the pressure-generator-side system pressure is set according to the desired setpoint brake pressure with the aid of pressure generation device 40. To this end, as described earlier, the desired setpoint brake pressure may possibly first be ascertained with the aid of brake-request signal 3, and control unit 5 generates a motor actuation signal 5M for actuating pressure generation device 40, in particular for operating electric motor 41 in such a way that it moves displacement piston 42 in the forward direction. Simultaneously with the operation of pressure generation device 40, isolation valve 44 is actuated. For this purpose, control unit 5 generates a valve control signal 5V, which induces an actuator of isolation valve 44, e.g., electromagnet 54, to exert an opening force on isolation valve 44, which is of a magnitude such that the closing force at which preloading device 51 preloads isolation valve 44 is compensated. For example, valve control signal 5V induces voltage source 55 to generate a current flow through electromagnet 54, which generates an opening force of sufficient magnitude to overcome the closing force exerted by preloading device 51 on valve body 52. Since this takes place simultaneously with the actuation of pressure generation device 40, the pressure in brake-side section 45A of hydraulic path 45 is initially still greater than in the pressure-generator-side section 45B. Because of the actuation of isolation valve 44, the closing force exerted by preloading device 51 is actually overcome but not a hydraulic force acting in brake-side section 45A due to the greater pressure. This therefore ensures that isolation valve 44 stays closed until the pressure in pressure-generator-side section 45B of hydraulic path 45 is greater than or equal to the pressure in brake-side section 45A.

As a result, only a low opening force at the level of the closing force must be generated by the actuator of isolation valve 44 during the hydraulic coupling, e.g., using electromagnet 54, and isolation valve 44 is able to be reliably opened with an advantageous avoidance of pressure peaks in pressure-generator-side section 45B. If the actuator of isolation valve 44 is electrically operable such as electromagnet 54 in FIG. 2, only small currents are advantageously required for the actuation, which improves the reliability of brake system 1.

What is claimed is:

1. A method for operating a brake system for a vehicle, the method comprising the following steps:
generating a brake request signal which characterizes a brake request by actuating a positioner system of an actuating circuit;
ascertaining a setpoint brake pressure required in an active circuit based on the brake request signal;
setting an actual brake pressure in the active circuit according to the setpoint brake pressure using a pressure generation device;
hydraulic decoupling a wheel brake, actuated by the active circuit, from the pressure generation device by closing an isolation valve that is situated in a hydraulic path between the pressure generation device and the wheel brake, a preloading device preloading the isolation valve to a closed state counter to an inflow direction of a volume flow into a brake-side section of the hydraulic path between the isolation valve and the wheel brake;
lowering a pressure-generator-side system pressure between the pressure generation device and the isolation valve using the pressure generation device; and
hydraulically coupling the wheel brake by opening the isolation valve in that an actual brake pressure as the pressure-generator-side system pressure is set according to the setpoint brake pressure using the pressure generation device and an opening force is simultaneously applied to the isolation valve such that a compensation of a closing force by which the preloading device preloads the isolation valve takes place.

2. The method as recited in claim 1, wherein the positioner system has a master brake cylinder, which is actuable by an actuation device, and a sensor system, and the generation of the brake request signal includes an acquisition of a hydraulic pressure generated by the actuation of the master brake cylinder in the actuating circuit, and/or an acquisition of a positioning travel of the actuation device, as variables, characterize the brake request.

3. The method as recited in claim 1, wherein the pressure generation device has a displacement piston, which is moved in a forward direction during the hydraulic coupling for adjustment of the actual brake pressure as the pressure-generator-side system pressure according to the setpoint brake pressure in order to generate a volume flow in the inflow direction.

4. The method as recited in claim 1, wherein hydraulic fluid is introduced into the pressure-generator-side section of the hydraulic path during the lowering of the pressure-generator-side system pressure.

5. The method as recited in claim 1, wherein the isolation valve is a solenoid valve and a current flow is generated for opening the isolation valve.

6. A brake system for a vehicle, comprising:
an actuating circuit having a positioner system actuable by an actuation device for generation of a brake request signal;
an active circuit having a pressure generation device, at least one wheel brake hydraulically coupled with the pressure generation device, and an isolation valve, which is situated in a hydraulic path between the pressure generation device and the wheel brake, a preloading device preloading the isolation valve to a closed state counter to an inflow direction of a volume flow into a brake-side section of the hydraulic path between the isolation valve and the wheel brake; and
a control unit which is connected to the positioner device of the actuating circuit, to the pressure generation device, and to the isolation valve, the control unit being configured to ascertain from the brake request signal a setpoint brake pressure required in the active circuit, to actuate the pressure generation device for the adjustment of an actual brake pressure in the active circuit according to the setpoint brake pressure, to close the isolation valve for the hydraulic decoupling of the wheel brake from the pressure generation device, and to open the isolation valve for the hydraulic coupling of the wheel brake in that the control unit actuates the pressure generation device for adjustment of the actual brake pressure in a pressure-generator-side section of the hydraulic path between the isolation valve and the pressure generation device according to the setpoint brake pressure, and simultaneously applies an opening force to the isolation valve such that a compensation of a closing force by which the preloading device preloads the isolation valve takes place.

7. The brake system as recited in claim 6, the positioner system having a master brake cylinder, which is actuable by the actuation device, and a sensor system configured to acquire a hydraulic pressure in the actuating circuit generated by actuating the master brake cylinder, and/or to acquire a positioning travel of the actuation device, as variables characterizing a brake request, the brake request signal being formed by the variables that characterize the brake request and are acquired using the sensor device.

8. The brake system as recited in claim 6, wherein the pressure generation device has a displacement piston which is movable in a translatory fashion in a forward direction in order to generate a volume flow in the inflow direction.

9. The brake system as recited in claim 6, wherein the isolation valve is a solenoid valve to which a current flow may be applied in order to adjust an open state.

* * * * *